(12) United States Patent
Matsuura et al.

(10) Patent No.: US 7,274,436 B2
(45) Date of Patent: Sep. 25, 2007

(54) DISTANCE MEASURING DEVICE FOR A VEHICLE

(75) Inventors: Yoshio Matsuura, Kasugai (JP); Masao Komaya, Komaki (JP)

(73) Assignee: OMRON Corporation, Kyoto (JP)

( * ) Notice: Subject to any disclaimer, the term of this patent is extended or adjusted under 35 U.S.C. 154(b) by 43 days.

(21) Appl. No.: 11/361,300

(22) Filed: Feb. 23, 2006

(65) Prior Publication Data

US 2006/0274299 A1    Dec. 7, 2006

(30) Foreign Application Priority Data

Jun. 6, 2005    (JP)    ............... 2005-165019

(51) Int. Cl.
*G01C 3/08*    (2006.01)
*G01S 13/00*    (2006.01)
(52) U.S. Cl. .................. 356/4.01; 356/5.03; 342/70
(58) Field of Classification Search ............... 356/4.01, 356/5.01, 5.03, 28; 342/70–72; 701/223
See application file for complete search history.

(56) References Cited

U.S. PATENT DOCUMENTS

| 6,018,308 | A | 1/2000 | Shirai et al. | |
|---|---|---|---|---|
| 6,813,370 | B1* | 11/2004 | Arai | 382/104 |
| 2002/0003489 | A1* | 1/2002 | Samukawa et al. | 342/70 |
| 2002/0014988 | A1 | 2/2002 | Samukawa et al. | |
| 2004/0065814 | A1 | 4/2004 | Miyazaki et al. | |
| 2004/0098196 | A1* | 5/2004 | Sekiguchi | 701/301 |
| 2005/0010351 | A1* | 1/2005 | Wagner et al. | 701/96 |

FOREIGN PATENT DOCUMENTS

| JP | 08-082679 | 3/1996 |
|---|---|---|
| JP | 11-014746 | 1/1999 |
| JP | 2003-42757 | 2/2003 |

* cited by examiner

*Primary Examiner*—Isam Alsomiri
(74) *Attorney, Agent, or Firm*—Beyer Weaver LLP (57) ABSTRACT

A distance measuring device for a vehicle emits electromagnetic waves forward for a scan both in horizontal and vertical directions. It is judged from received light whether or not the distance to a detected object is within a specified preset range. If the distance is found to be within this range and if at least two specified conditions are satisfied, this object is regarded as a vehicle in the subsequent scans and a flag is set to this effect. One of these two conditions requires this object to have been judged as being a front going vehicle continuously over a time longer than a preset minimum time length. The second condition is that the difference between the distance to this object measured by a scan that is the highest or nearly the highest in the vertical direction and the measured distance to a front going vehicle corresponding to the object is within a predetermined range.

8 Claims, 10 Drawing Sheets

DISTANCE MEASURING DEVICE FOR A VEHICLE

Priority is claimed on Japanese Patent Application 2005-165019 filed Jun. 6, 2005.

BACKGROUND OF THE INVENTION

This invention relates to an on-vehicle distance measuring device for determining whether an object in front is a vehicle or not and measuring the distance to such an object by carrying out a two-dimensional scan with electromagnetic waves such as laser light. In particular, this invention relates to such a device capable of preventing erroneously identifying a vehicle in front as a road surface while recognizing it and thereby losing sight of it.

Devices of this type for determining whether an object in front is a vehicle or not and measuring the distance to such an object by carrying out a two-dimensional scan with electromagnetic waves such as laser light have the possibility of erroneously identifying reflected waves from a road surface in front as those coming from a vehicle. In view of this possibility, Japanese Patent Publication Tokkai 2003-42757 (Ref. 1) described a method of preventing such a misjudgment by recognizing the difference between distance-direction patterns of reflected waves from a road surface and those from a vehicle. For broadly preventing a misjudgment, Japanese Patent Publication Tokkai 2004-125739 (Ref. 2) described a method of shifting an electromagnetic beam to a position where the reception intensity is higher while carrying out an offset adjustment in the vertical position. Japanese Patent Publication Tokkai 11-14746 (Ref. 3) described a device adapted to adjust the beam angle of electromagnetic waves such that the beam would become parallel to the road surface being traveled upon. Japanese Patent Publication Tokkai 8-82679 (Ref. 4) described a device provided with pulse transmitting means both for a long-distance range and a short-distance range and adapted to prevent receiving waves reflected by the road surface by offsetting somewhat upward the direction of transmission for the signal transmitting means for the shorter-distance range.

Conventional devices according to Ref. 1 are capable of distinguishing a front going vehicle from a road surface if reflected waves from a reflector of the body of the front going vehicle are being detected because distance-direction patterns of reflected waves from a road surface are significantly different from those from a vehicle. When the vehicle on which the device is mounted (hereinafter referred to as the own vehicle) is accelerating or if the road condition is changing such that the orientation of the own vehicle changes, this affects the direction of transmission of the laser light. If the front going vehicle has a body type that does nor reflect light well or if it is simply dirty, the waveform pattern reflected from such a vehicle may resemble that from a road surface. In such a situation, the distinction becomes difficult to make and it becomes easier to lose sight of a front going vehicle. This situation will be explained next with reference to FIGS. 1-3.

Figure 1:
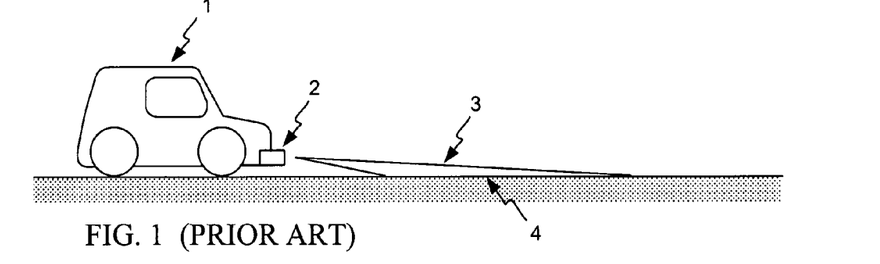
FIG. 1 shows a situation where laser light emitted from a laser radar is reflected by a road surface and detected.
Figure 2:
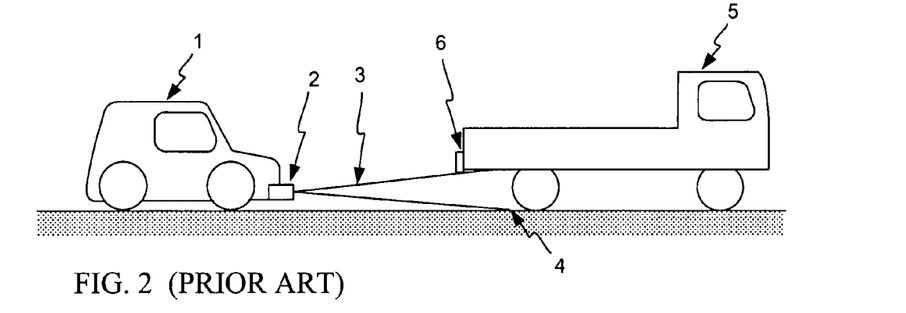
FIGS. 2 and 3 show situations where laser light emitted from a laser radar is not reflected by the reflector on a front going truck but is reflected by its other parts and detected.
Figure 3:
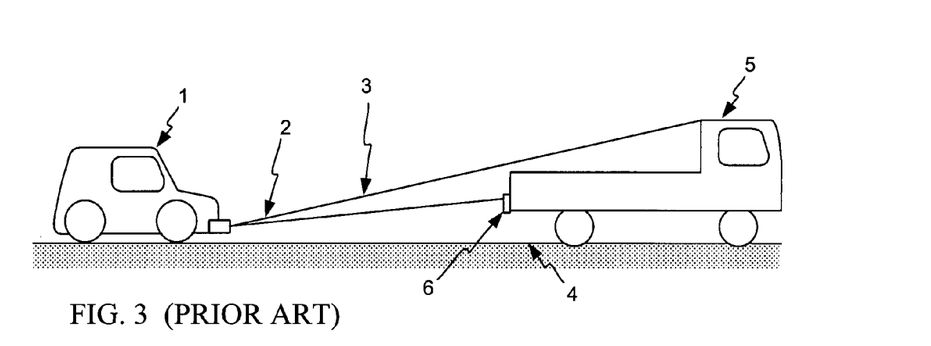

FIG. 1 shows a situation where there is no vehicle in front and laser light 3 transmitted from a laser radar 2 mounted to a front part of the own vehicle 1 is reflected by a road surface 4 and being detected. FIG. 2 shows another situation where the laser light 3 is not reflected by the reflector 6 of a front going vehicle 5 (being a truck in this example) but is undergoing complicated reflections by its lower back portions to be detected. FIG. 3 shows still another situation where the laser light 3 is not reflected by the reflector 6 of the front going truck 5 but is being reflected by upper parts of its back portion and the back part of the driver's cab. In the situations shown by FIGS. 2 and 3, the quantity of reflected light is small because the laser light 3 is not reflected by the reflector 6 and the waveform pattern of the reflected waves expands in the direction of the distance, coming to resemble that of reflected waves from a road surface.

The problem as described above is particularly serious in the case of so-called low speed following (LSF) mode at the time of traffic congestion. (See, for example, http/www.hido.or.jp/ITS/TS/TSF/4¥_glossary.html) If the front going vehicle becomes lost in the LSF mode, a "mode cancel" condition is started and there is no more following continued. In summary, once the waveform pattern of the reflected waves comes to resemble that from a road surface and the front going vehicle is lost, it becomes impossible to follow it and hence to further continue measuring the distance to it.

Even with devices according to Refs. 2-4, it is difficult to correctly distinguish between waveform patters of reflected waves from a vehicle and from a road surface under a special situation as described above, and it was not possible to avoid losing sight of a front going vehicle.

SUMMARY OF THE INVENTION

It is therefore an object of this invention to provide an on-vehicle distance measuring device capable of avoiding situations of losing sight of a front going vehicle even where the waveform pattern of reflected waves from a vehicle resembles that from a road surface.

This invention relates to a distance measuring device for a vehicle, adapted to emit electromagnetic waves forward for a scan both in horizontal and vertical directions, to measure a distance to an object based on reflected waves therefrom and to judge whether this object is a vehicle or not. The electromagnetic waves for this purpose may be laser light and the distance to an object in front may be measured by receiving the reflected laser light by means of a photodiode and by measuring the time for receiving the reflected light.

A distance measuring device of this invention is comprised of a control circuit functioning as what are hereinafter referred to as vehicle recognizing means, range judging means and vehicle confirming means to recognize and confirm an object to be a vehicle. In the above, to confirm an object as a vehicle means to recognize the object to be a vehicle and not to thereafter recognize it as a road surface no matter how the circumstances may change.

What is referred to as vehicle recognizing means is for judging by each horizontal scan whether or not a recognized vehicle is a front going vehicle. Of one or more vehicles that may be recognized, the one that is traveling in the same traffic lane in which the own vehicle is traveling and the closest to the own vehicle in front is referred to as the front going vehicle. Once an object detected at a certain timing is recognized as a front going vehicle, a flag to this effect is set.

What is referred to as range judging means is for judging whether or not the distance to an object in front is within a specified preset range. This "specified preset range" is a range in which the reflected waves may be considered to be from a road surface such as a range of 20 m from to the front of the own vehicle.

What is referred to as vehicle confirming means is for confirming an object to be a vehicle at later scans if this object has been judged by the range judging means to be at a distance within the aforementioned specified preset range and if what are hereinafter referred to as first condition and second condition are both satisfied. What is referred to as the first condition is the condition that the object is judged by the vehicle recognizing means to be a front going vehicle continuously over a time longer than a preset minimum time length. What is referred to as the second condition is the condition that the difference between the distance to the object measured by a scan that is earlier than the aforementioned later scans and is the highest or nearly the highest in the vertical direction and the measured distance to a front going vehicle corresponding to the object is within a predetermined range.

If these two conditions are satisfied in a certain horizontal scan, the corresponding object is judged to be a vehicle in the subsequent scans. Thus, this vehicle will not be lost sight of. Neither will the front going vehicle, which is a vehicle selected from one or more objects each recognized as a vehicle, be lost sight of.

If the aforementioned first condition is satisfied, this means that the object in question has been judged to be a front going vehicle continuously at least for the present minimum time length before the time of the previous scan. In such a case, even if this object is judged to be within the specified preset range, the probability of this object judged as a vehicle is high.

If the aforementioned second condition is satisfied, when the object in front is judged to be within the specified preset range, the difference between the distance measured by the highest or nearly the highest horizontal scan and the measured distance to the front going vehicle corresponding to this object is within the predetermined range. The distance to the front going vehicle corresponding to the object by the previous scan is measured by the present scan. This measured distance to the front going vehicle is compared with the measured distance to the object obtained by the highest or nearly the highest horizontal scan and if this difference is within the predetermined range, it may be considered very likely that this object is a vehicle even if this object is judged to be within the specified preset range. Explained in simple terms, if the front going vehicle can be caught by the highest horizontal scan or nearly the highest horizontal scan in the two-dimensional scan, the probability is quite high that the reflected waves are not from the road surface but from a vehicle.

According to a preferred embodiment, the scanning is effected by forming the horizontally scanning beam by what are referred to as the main beam scanning in one horizontal direction (such as the rightward direction) and the sub-beam scanning in the opposite direction (such as the leftward direction). A frame is formed with a main beam and a sub-beam and scans in a vertical direction. The aforementioned vehicle recognizing means, range judging means and vehicle confirming means operate in units of frames, and the vehicle confirming means, when judging the second condition, examines whether the sub-beam of the previous frame was the highest or nearly the highest in the vertical direction and whether the difference between the distance to the object measured by the scan with the sub-beam that is the highest or nearly the highest in the vertical direction and the measured distance to a front going vehicle corresponding to this object is within the predetermined range.

If the vehicle confirming means judges that these two conditions are satisfied, the probability of this object in question being a vehicle is very high and hence this object is confirmed as being a vehicle in the subsequent scans such that the situation of losing sight of the front going vehicle can be avoided.

In addition to the aforementioned two conditions, what is herein referred to as the third condition may additionally be considered in order to make the judgment by the vehicle confirming means even more stringent. The third condition may require that the object in question has been judged to be a moving object and has earlier been judged to be a front going vehicle by the vehicle recognizing means.

As another embodiment of the invention, the vehicle confirming means may be adapted to confirm that an object, if it is once judged to be outside the aforementioned specified preset range, to be a vehicle in scans carried out thereafter. In other words, since there is no problem in regarding an object which was observed at a distant location in the past as a vehicle, it is allowed to be confirmed as a vehicle. This serves to prevent the occurrence of a front going vehicle becoming lost, and the process becomes simplified because some needless efforts to examine whether the reflected light was from a road surface or not can be dispensed with.

In summary, the present invention serves to prevent a front going vehicle from becoming lost even if the waveform pattern from a vehicle resembles that from a road surface. Thus, the front going vehicle can be reliably followed even where the condition of reflection from the front going vehicle is adverse.

DETAILED DESCRIPTION OF THE INVENTION

Figure 4:
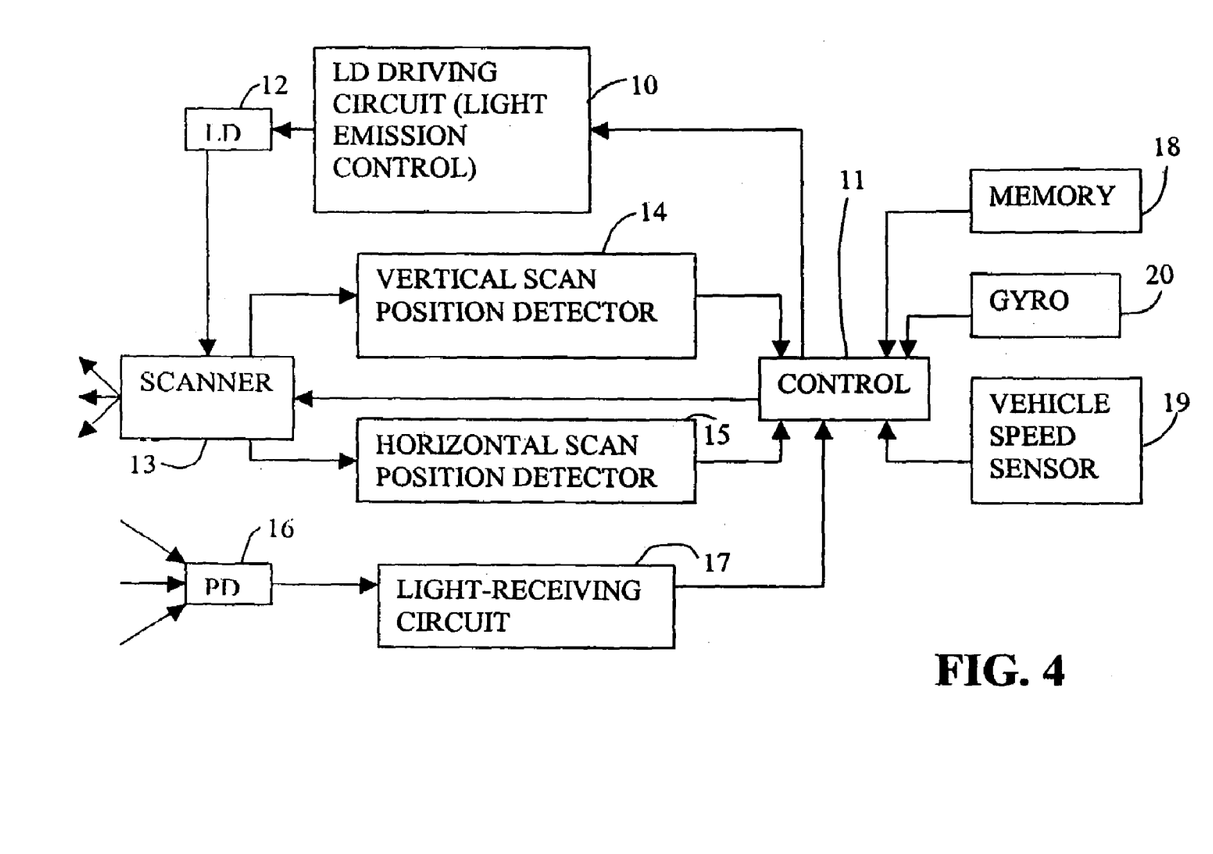
FIG. 4 is a block diagram of a laser radar (as an on-vehicle distance measuring device) embodying this invention.

FIG. 4 is a block diagram of a laser radar (as an on-vehicle distance measuring device) embodying this invention, including a laser diode (LD) driving circuit 10 serving to control emission of light from a laser diode (LD) 12 based on a driving signal generated by a control circuit 11 and a scanner 13 serving to scan a specified scan area with the laser light from the LD 12 under the control of the control circuit 11. The laser light emitted from the scanner 1 is projected in the (forward) direction of travel of the own vehicle through a projection lens. A vertical scan position detector 14 and a horizontal scan position detector 15 serve to detect the scan position of the laser light respectively in the vertical direction and the horizontal direction and to output them to the control circuit 11.

Reflection of the laser light from the LD 12 returning from an object in front (such as a vehicle or a road surface) is converged by a reception lens and received by a photodiode (PD) 16, and a signal corresponding to its received light level is outputted to a light-receiving circuit 17 which serves to output the received signal level of the inputted reflected light converted into a number. The control circuit 11 stores the inputted number (received light level) in a memory 18 in correlation with the scan position inputted from the vertical and horizontal scan position detectors 14 and 15. The memory 18 also serves to store correction values for the optical axis and to assign a vehicle identifying flag for ascertaining, when a detected object is determined to be a vehicle, that it is a vehicle. A vehicle speed sensor 19 and a gyroscope 20 are connected to the control circuit 11. The vehicle speed sensor 19 is for detecting the speed of the own vehicle, and the gyroscope 20 is for detecting its yaw rate (or the speed of rotation in the horizontal direction).

The control circuit 11 serves not only to correct the optical axis (extending to the center of the scan area in the vertical direction) based on the stored received light level but also to measure the distance between an object in front (such as a front going vehicle) and the own vehicle based on the time elapsed since the laser light is emitted until its reflection is received. It also serves to judge whether the detected object is a vehicle or not, and whether the detected object is a road surface or not and also to recognize a front going vehicle out of the objects ascertained to be a vehicle. Throughout herein, the front going vehicle means the vehicle which is traveling in the same traffic lane as the own vehicle.

Figure 5:
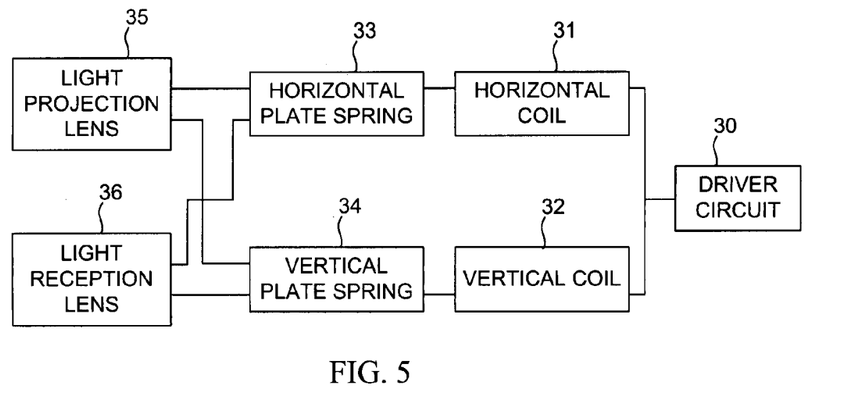
FIG. 5 is a block diagram of the parts that support the light projection lens and the light receiving lens of the scanner.

FIG. 5 shows the structure of the parts that support the light projection lens 35 and the light reception lens 36 of the scanner 13.

As a control signal from the control circuit 11 is inputted to a driver circuit 30, the driver circuit 30 supplies driving currents to coils 31 and 32 respectively for driving in the horizontal direction and in the vertical direction based on the inputted control signal. These coils 31 and 32 serve to move a member (not shown) for integrally supporting the light projection lens 35 and the light reception lens 36 in the vertical and horizontal directions. This supporting member is itself supported by a horizontal plate spring 33 and a vertical plate spring 34 so as to be movable in the horizontal and vertical directions. Thus, the supporting member, together with the light projection lens 35 and the light reception lens 36, moves to and stops at the equilibrium horizontal position where the force generated in the horizontal coil 31 and the reaction force generated in the horizontal plate spring 33 balance each other and the equilibrium vertical position where the force generated in the vertical coil 32 and the reaction force generated in the vertical plate spring 34 balance each other. The positions of these lenses 35 and 36 are detected by lens sensors (not shown) and these detected positions are inputted to the driver circuit 30 to form a servo mechanism, and the lenses 35 and 36 can be shifted to specified horizontal and vertical positions.

Figure 6:
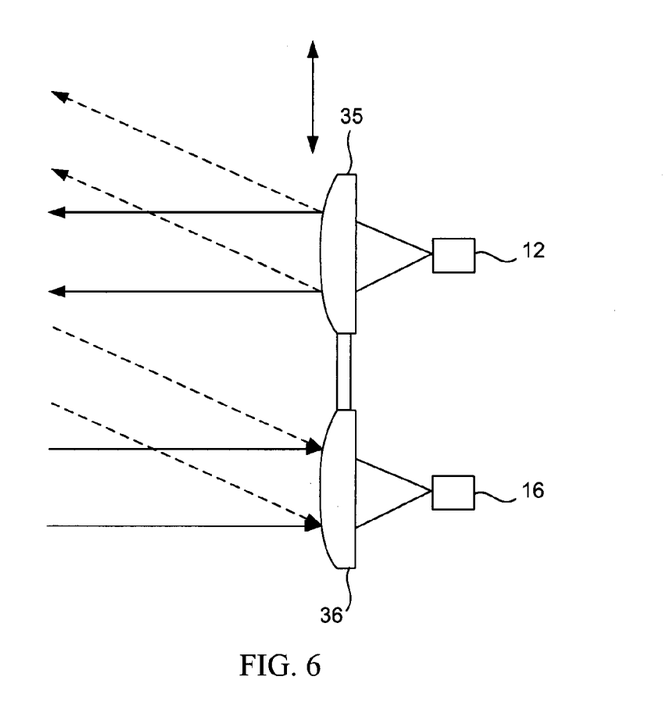
FIG. 6 shows the optical paths through the light projection and receiving lenses moved by the scanner.

The optical paths through the light projection and reception lenses 35 and 36 moved by the scanner 13 are shown in FIG. 6. The light projection lens 35 is positioned in front of the LD 12, and the light reception lens 36 is positioned in front of the PD 16. The laser light from the LD 12 is deflected to the center direction of the light projection lens 35. If the light projection lens 35 is at the center, optical paths are as shown by solid lines in FIG. 6 and the laser light is emitted to the center. The emitted laser light is reflected by an object (such as a vehicle) in front and is received by the light reception lens 36 and the PD 16.

If the light projection lens 35 is moved upward (in FIG. 6) by the scanner 13, the optical paths are as shown by broken lines in FIG. 6. Thus, the laser light is emitted in the upward direction and the light reflected by an object at an upward position is received through the light reception lens 36 by the PD 16 as shown.

The scanner 13 moves the light projection and reception lenses 35 and 36 thus together horizontally to scan a front area horizontally. Similarly, the light projection and reception lenses 35 and 36 are moved vertically together as a single body to scan the front area vertically.

Figure 7:
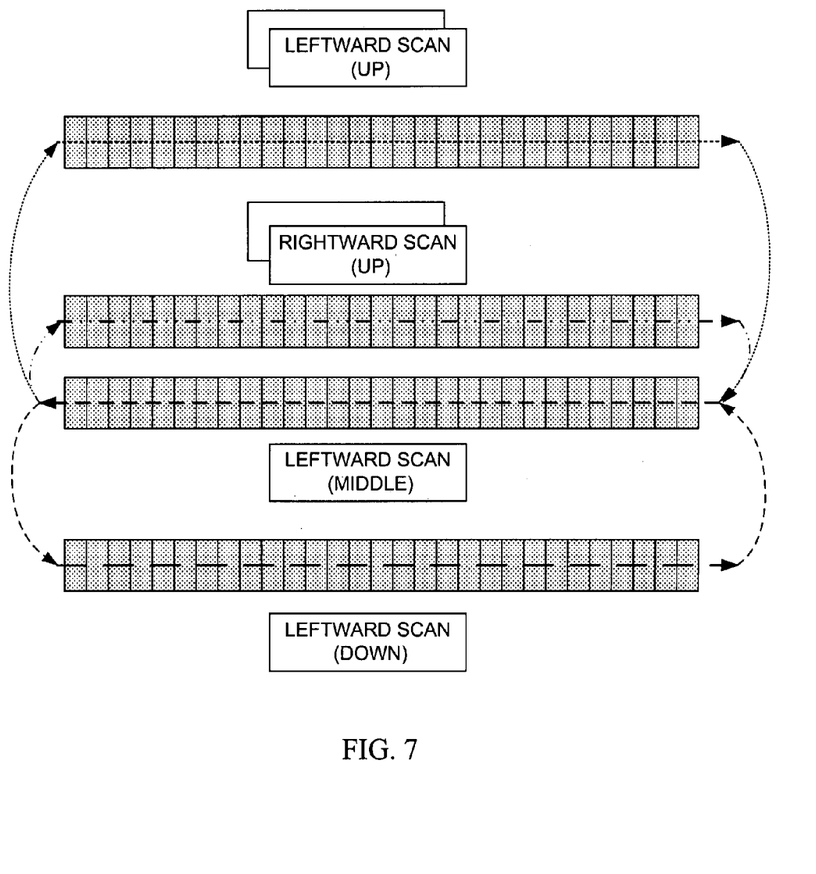
FIG. 7 is a diagram showing a manner of scanning in the horizontal and vertical directions.

FIG. 7 is a diagram showing a manner of scanning in the horizontal and vertical directions. In the example, the horizontal scan is comprised of three frames, each frame being formed with a scan to the right and a scan to the left. In what follows, for convenience, the scan to the right and the scan to the left will respectively be referred to as the rightward scan and the leftward scan and the beams carrying out the rightward scan and the leftward scan will respectively be referred to as the main beam and the sub-beam. The vertical position of the rightward scan for each frame is the same but the vertical positions of the leftward scan for the three frames are different and will be referred to as "up", "middle" and "down", or "leftward scan (up)", "leftward scan (middle)" and "leftward scan (down)". The difference in elevation angle between "up" and "middle" and that between "middle" and "down" is about 1° although this depends on the angle of spread of the scan beam in the vertical direction such that angular directions in between will not be missed by the scanning beam.

The scanning time is set to 50 msec for both rightward scan and leftward scan. One rightward scan and one leftward scan form one frame. If the received light intensity by the leftward scan is low with respect to the quantity of received light by the rightward scan, the optical axis is shifted in the direction of higher received light intensity. This process is repeated to move the optical axis in the direction of obtaining a higher received light intensity.

Figure 8:
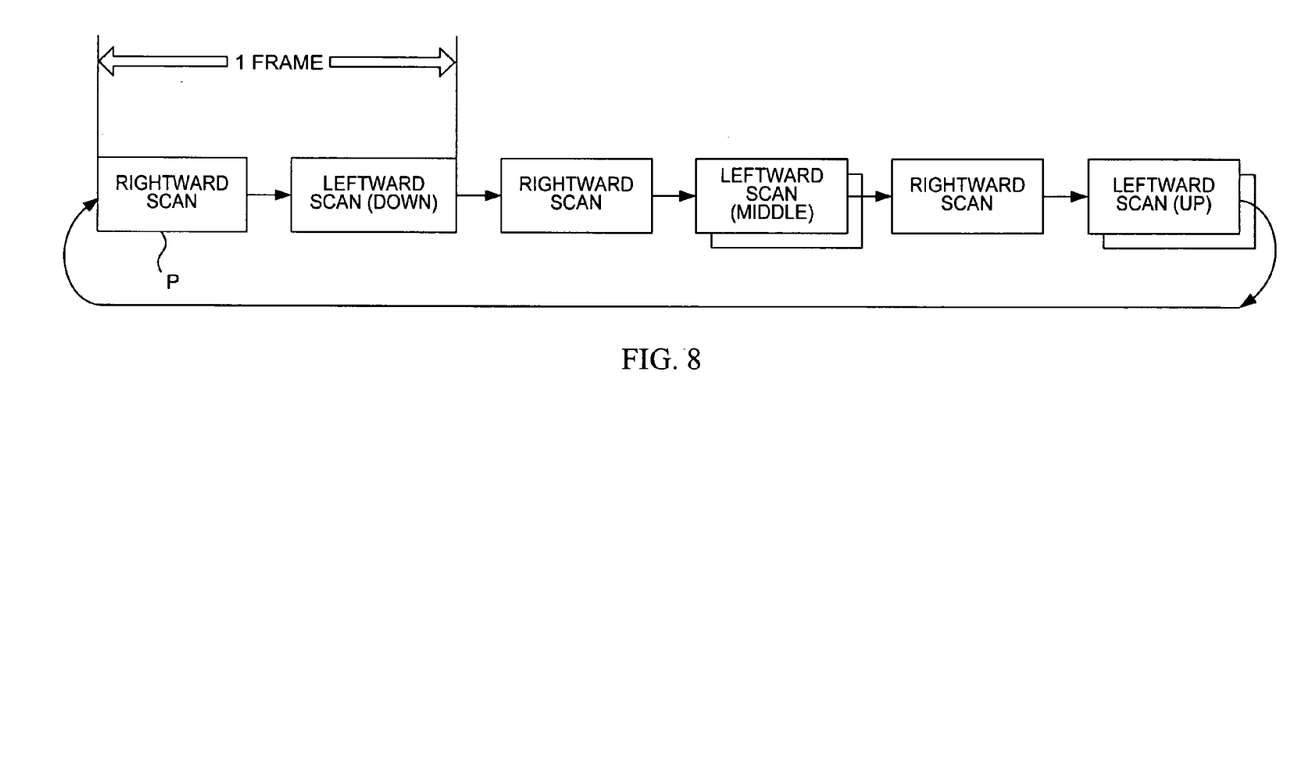
FIG. 8 is a drawing for showing a routine for processing rightward and leftward scans.

FIG. 8 shows a routine for processing rightward and leftward scans, that is, repetitions are made as follows to continuously carry out a two-dimensional scan in the horizontal and vertical directions: Rightward scan → Leftward scan (down) →Rightward scan → Leftward scan (middle) →Rightward scan → Leftward scan (up) → Rightward scan →Leftward scan (down) → . . . .

One rightward scan and one leftward scan forming one frame, as explained above, the process is repeated in units of three frames. Processes carried out for each frame include the "vehicle confirmation process", the "front going vehicle judging process" and the "road surface judging process". In the vehicle confirmation process, if an object is once recognized as a vehicle, a confirmation flag is set for this object and thereafter this object is confirmed as a vehicle. The road surface judging process is for judging whether an object for which the confirmation flag is not set is a road surface or not. The front going vehicle judging process is for judging which of the objects which have not been identified as road surface is the front going vehicle.

Next, a routine for data processing is explained in detail with reference to FIGS. 9, 10 and 11.

Figure 9:
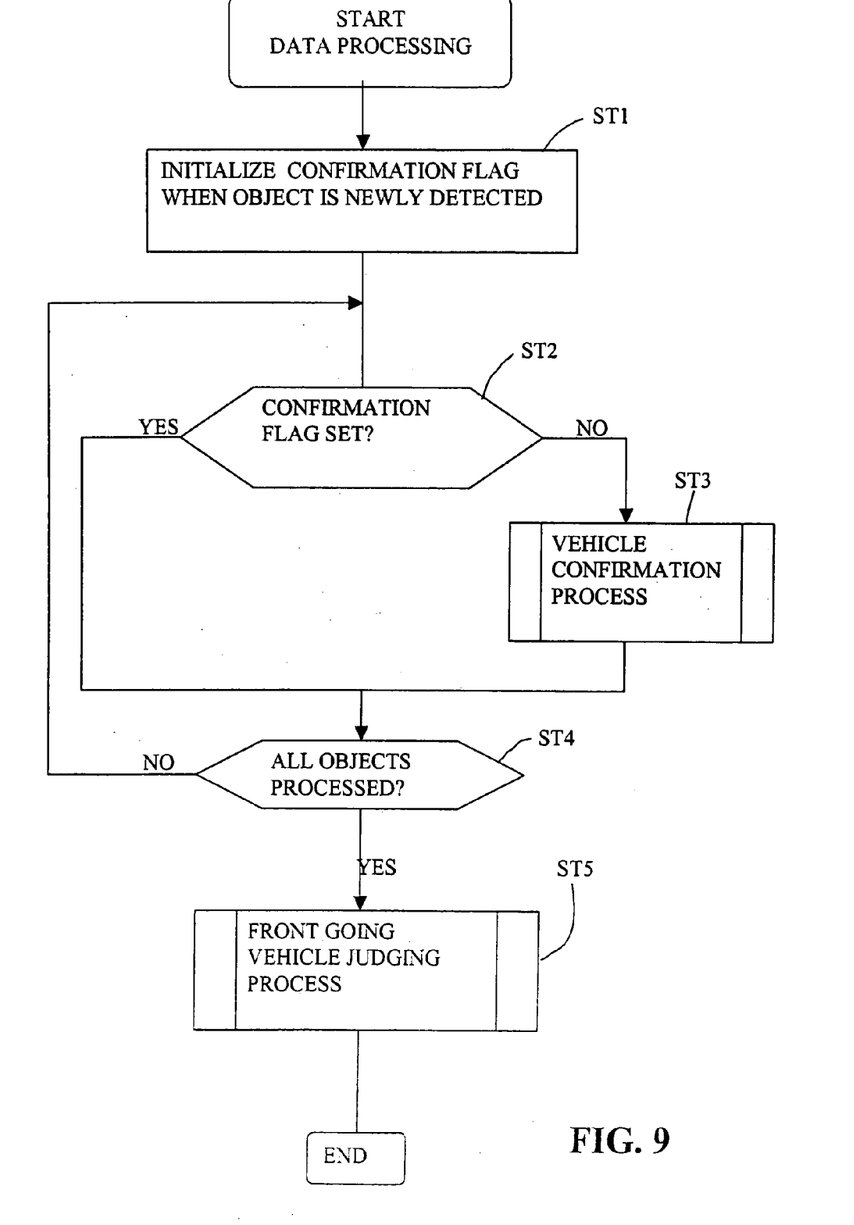
FIGS. 9, 10 and 11 are flowcharts for showing a routine for processing measured data.

FIG. 9 is a flowchart of a data processing routine as a whole. As measured data obtained by a rightward scan of any frame are taken into the memory 18, an area for a confirmation flag for a newly detected object is assigned at a specified area of the memory 18 (initialization of the confirmation flag) (Step ST1). It is judged in Steps S2-S4 whether or not a confirmation flag has been set for each of all detected objects and the process of confirming as a vehicle (Step S3) is carried out for each of the objects for which a flag has not been set. For each of the objects for which a flag has been set (YES in Step ST2), Step ST3 is skipped. After these processes are completed for all of the detected objects (YES in ST4), the front going vehicle judging process is carried out (Step ST5). If a front going vehicle is confirmed, the routine for the measured data obtained by the rightward scan of this frame is completed.

Figure 10:
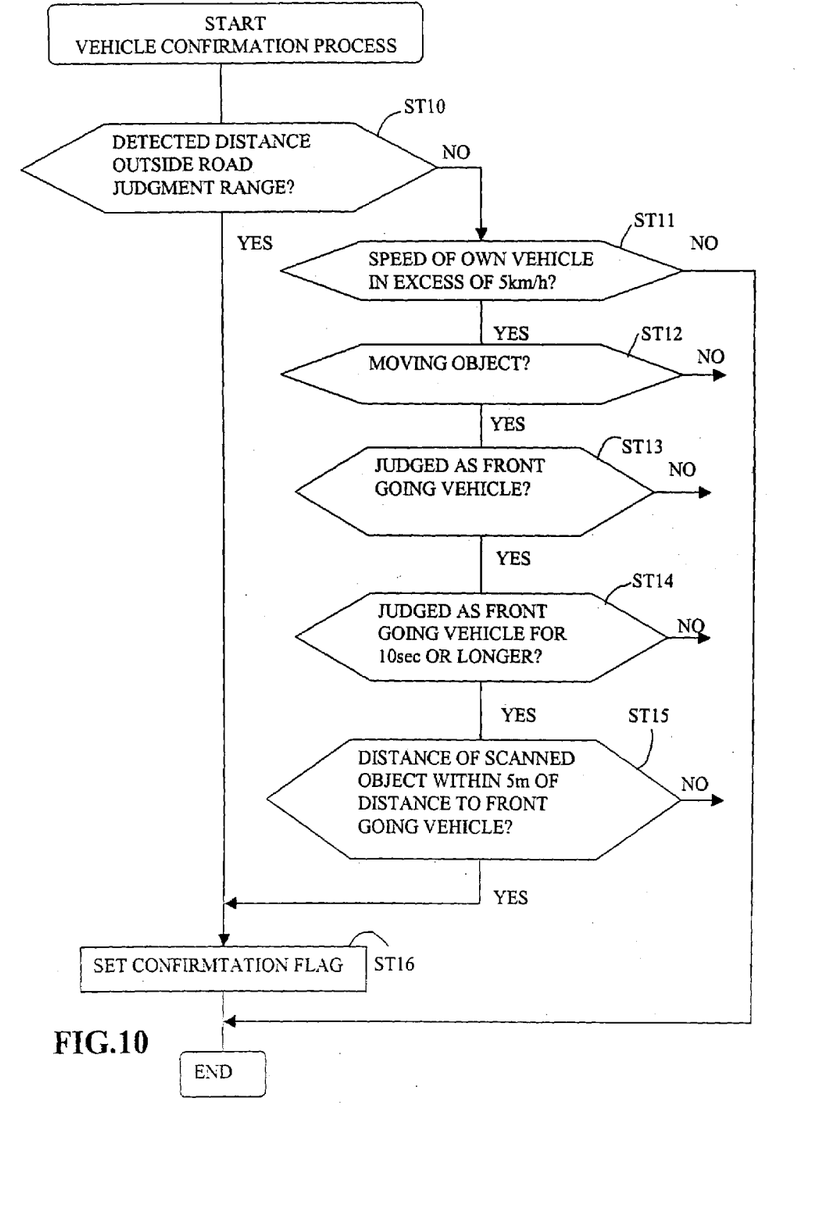

FIG. 10 shows a routine for the vehicle confirmation process. In Step ST10, it is determined whether the distance to the detected object being processed (hereinafter sometimes referred to simply as "the object") is within a specified preset range or not. This range is specified as that in which the object may be a road surface and may be set as less than 20 m such as 5-20 m. This range may be changed according to the speed of the own vehicle. In what follows, this range is referred to as the "road judgment range". Since the laser light does not reach the road surface immediately in front, the starting point of the road judgment range is some distance away.

If the object is determined to be outside the aforementioned range (YES in Step ST10), it may be concluded that the object is not a road surface but is a vehicle and a confirmation flag assigned to this object is set (Step ST19). If the object is within this range (NO in Step ST10), the vehicle identifying process of Step ST11 et seq is carried out because the object may be a road surface.

A plurality of conditions are examined in the vehicle identifying process of Step ST11 et seq before recognizing that it is a vehicle. These conditions are explained next sequentially.

One of the conditions is whether or not the own vehicle is moving with a speed in excess of 5 km/h (Step ST11). If the own vehicle is stopped, the object may be erroneously identified as a vehicle by the process of Step S12 et seq. So, this is to prevent this possibility. For example, it is judged from the output of the vehicle speed sensor 19 whether the own vehicle is moving with a speed of 5 km/h or not to determine whether it is stopped or not.

Another condition is whether or not the object is moving (Step ST12). The speed of the object relative to the road surface is obtained from its speed relative to the own vehicle that can be calculated from the difference between the measured distance from the previous frame and that from the present frame. If this speed relative to the road surface is less than a threshold value, there is a high probability that it is not a vehicle. Otherwise, it is likely that it is a vehicle.

Still another condition is whether it has already been judged to be a front going vehicle (Step ST13). Unless the object was judged to be a front going vehicle in the previous frame, probability is low that it is a vehicle.

Still another condition is whether it has been judged as a front going vehicle continuously over 10 seconds or more (Step ST14). If the object has been identified as a front going vehicle continuously for a plurality of frames over a specified length of time (such as 10 seconds), probability is high that it is a vehicle.

Still another condition is whether or not the absolute value of the difference between the measured distance to the object in the leftward scan (up) and the distance to the corresponding front going vehicle is 5 m or less (Step ST15) because if this difference is within a certain predetermined range (such as 5 m or less), the probability of the object being a vehicle increases.

If all of the conditions considered above are satisfied, it is reasonably safe to conclude that the object in question is a vehicle and a confirmation flag is set (Step ST16) for this object.

Although many conditions are examined in Steps ST10-ST15, some of the conditions are more conclusive than the others. According to this invention, the condition in Step ST14 (referred to as the first condition) and the condition in Step ST15 (referred to the second condition) are considered at least necessary conditions, that is, a determination whether the object is a vehicle or not can be made by considering only these two conditions. It is preferable, however, to additionally consider the conditions in Steps ST12 and ST13 (together referred to as the third condition) and even more preferable to further consider all conditions in Steps ST10-ST15, as described above in order to make certain that the object is a vehicle.

Figure 11:
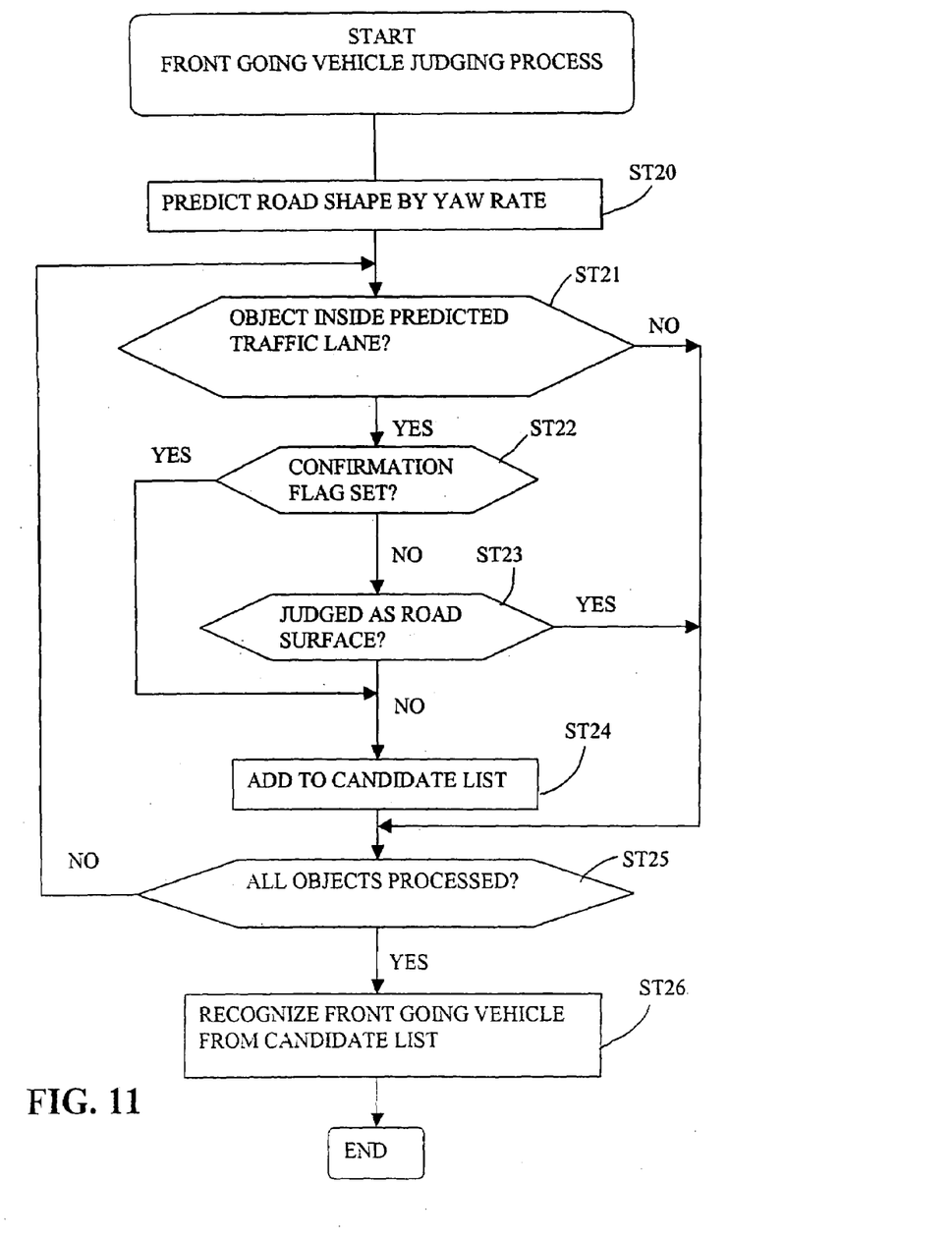
Figure 12:
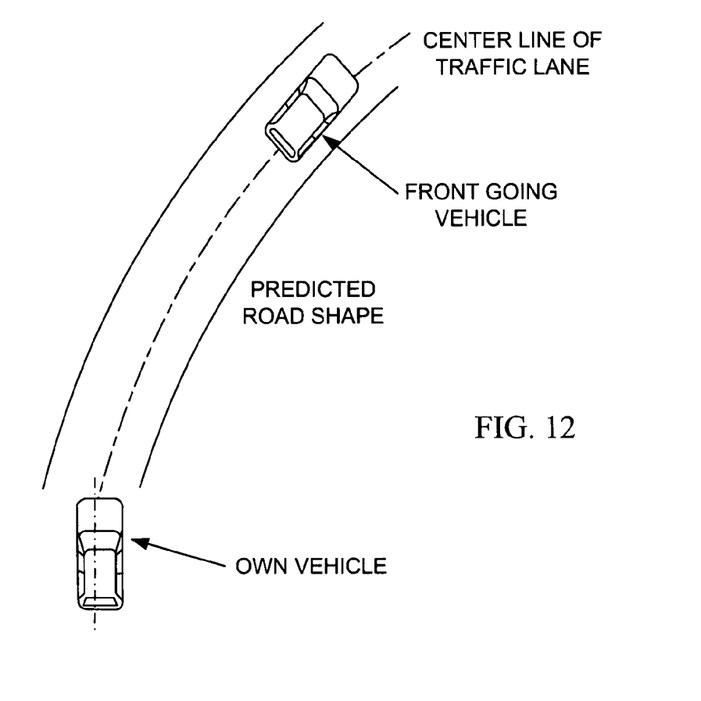
FIG. 12 is a drawing for explaining how the shape of the road is estimated.

FIG. 11 shows a routine for judging a front going vehicle. In Step ST20, the shape of the road in front is predicted from the yaw rate measured on the basis of the output from the gyroscope 20. In Step ST21, it is judged on the basis of the predicted shape of the road ahead as shown in FIG. 12 whether or not there is an object within the own traffic lane. This judgment may be made from the positional relationship between the front going vehicle and the center line of the traffic lane. If the center of the front going vehicle is off the center of the traffic lane of the own vehicle by less than one half of the width of the traffic lane, for example, it may be concluded that the front going vehicle is traveling within the own traffic lane.

The shape of the road ahead may be obtained by processing an image of the front taken by the camera or by means of a navigation system.

If it is judged that there is an object within the predicted own traffic lane (YES in Step ST21), it is examined whether or not a confirmation flag has been set regarding this object (Step ST22). If the flag is already set (YES in Step ST22), this object is added to a list (candidate list) of candidates as the front going vehicle (Step ST24). If the flag is not set (NO in Step ST22), it is determined whether or not it has been judged as road surface by another task (referred to as road surface judgment task (not shown)) (Step ST23).

Figure 13:
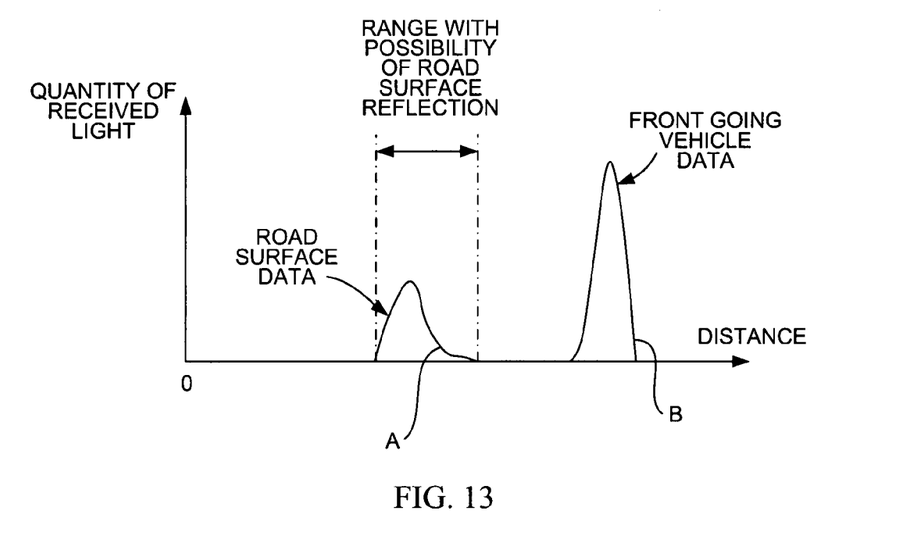
FIG. 13 is a graph for judging a road surface.

FIG. 13 shows a method of carrying out the road surface judging process, showing a distance-direction waveform pattern with the horizontal axis representing the distance and the vertical axis representing the quantity of received light, letter "A" indicating a road surface waveform pattern obtained from road surface data and letter "B" indicating a vehicle waveform pattern obtained from front going vehicle data. As can be understood from FIG. 13, these patterns are significantly different. While pattern "A" shows a relatively small quantity of received light, the waveform generally extends in the direction of the distance while pattern "B" is oppositely characterized. Thus, the road surface judging process can be carried out by extracting these characteristics from a received light signal. This road surface judging process is carried out as a different task in parallel with the aforementioned vehicle confirmation process explained above with reference to FIG. 10. If an object is determined to be a road surface, a road surface judgment flag is set for such an object.

If an object for which the confirmation flag has not been set is judged to be a road surface in Step ST23 (or the road surface judgment flag is set), nothing is done to such an object. In the case of an object for which the road surface judgment flag is not set, it may be a vehicle although the confirmation flag is not set yet and hence is added in Step ST24 to the candidate list the front going vehicle.

After all objects are thus processed (YES in Step ST25), the object at the shortest distance is selected out of the candidate list to be judged as the front going vehicle (Step ST26), and a relevant judgment flag judgment as front going vehicle) is set.

Figure 14:
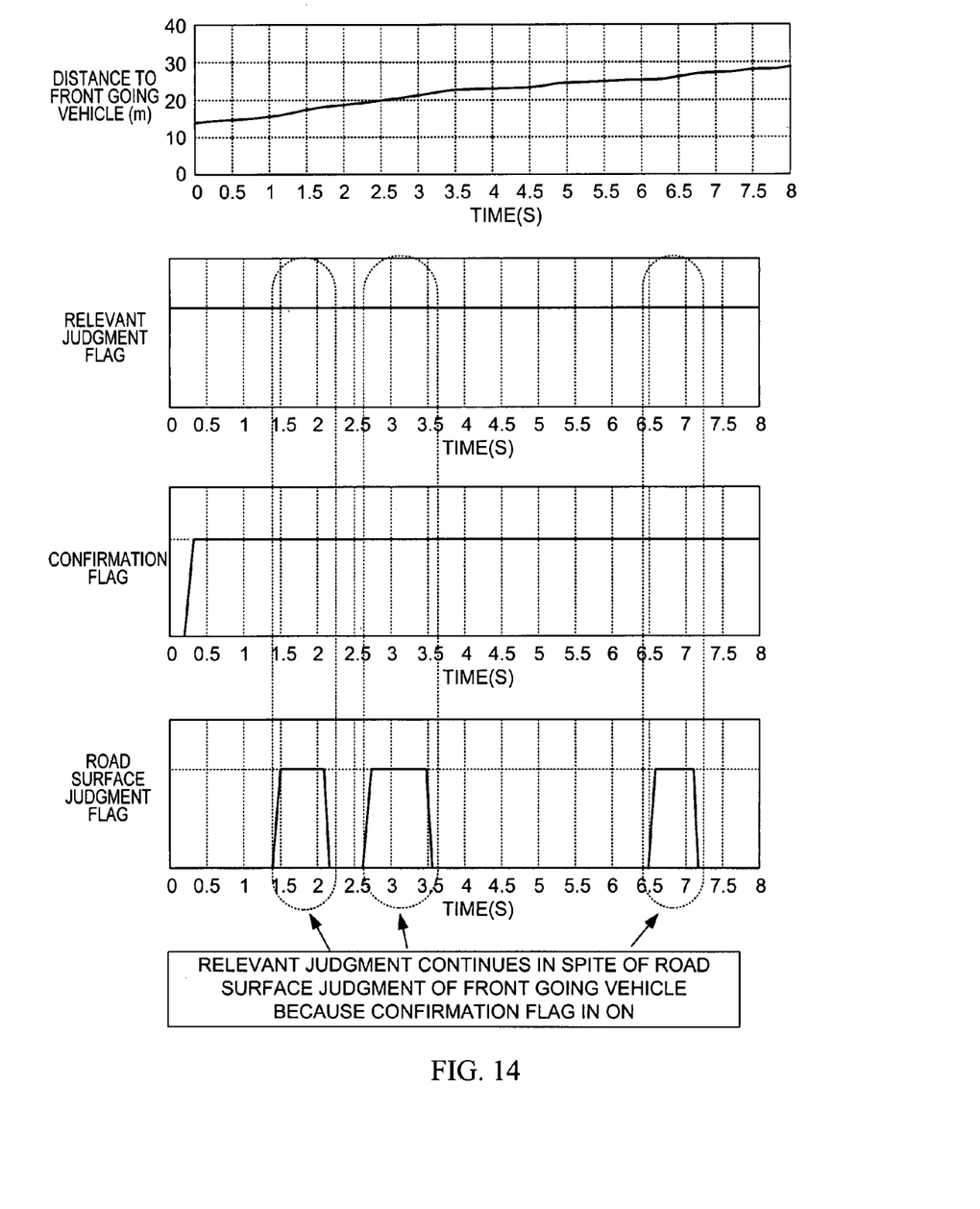
FIG. 14 shows an example of measured data.

FIG. 14 is an example of measured data from which a front going vehicle is recognized and confirmed as a truck by data processing. In this example, the front going vehicle is judged as a road surface at time intervals 1.5 s-2.2 s, 2.6 s-3.6 s and 6.6 s-7.2 s by the road surface judgment task but since the confirmation flag is set at 0.2 s, the road surface judgment flags in the set condition are ignored and the relevant judgment flag for judgment as front going vehicle is maintained in the set condition.

Thus, the possibility of the front going vehicle becoming lost by being judged as the road surface while being followed can be dependably avoided. Although the LSF mode becomes canceled if the front going vehicle becomes lost while this LSF mode is effective, such a possibility can be avoided.

What is claimed is:

1. A distance measuring device for a vehicle, adapted to emit electromagnetic waves forward for a scan both in horizontal and vertical directions, to measure a distance to an object based on reflected waves therefrom and to judge whether said object is a vehicle or not; said distance measuring device comprising:
    vehicle recognizing means for judging whether or not a recognized vehicle is a front going vehicle that is traveling in the traffic lane in which own vehicle is traveling;
    range judging means for judging whether or not the distance to an object in front is within a specified preset range; and
    vehicle confirming means for confirming an object to be a vehicle at later scans if said object has been judged by said range judging means to be at a distance within said specified preset range and if a first condition and a second condition are satisfied;
    wherein said first condition is that said object is judged by said vehicle recognizing means to be a front going vehicle continuously over a time longer than a preset minimum time length, and
    wherein said second condition is that the difference between the distance to said object measured by a scan that is earlier than said later scans and is the highest or nearly the highest in the vertical direction and the measured distance to a front going vehicle corresponding to said object is within a predetermined range.

2. The distance measuring device of claim 1 wherein said vehicle confirming means confirms said object to be a vehicle at said later scans if a third condition, as well as said first and second conditions, is satisfied;
    wherein said third condition is that said object has been judged to be a moving object and that said object has earlier been judged to be a front going vehicle by said vehicle recognizing means.

3. The distance measuring device of claim 2 wherein said vehicle confirming means, if said object is once judged to be outside said specified preset range, confirms said object to be a vehicle in scans carried out thereafter.

4. The distance measuring device of claim 3 wherein said scan is effected with a main beam scanning in one horizontal direction and a sub-beam in the opposite horizontal direction, said main beam and said sub-beam forming a frame to scan in a vertical direction;
    wherein said vehicle recognizing means, said range judging means and said vehicle confirming means operate in units of frames; and
    wherein said vehicle confirming means, when judging said second condition, examines whether the sub-beam of the previous frame was the highest or nearly the highest in the vertical direction and whether the difference between the distance to said object measured by the scan with said sub-beam that is the highest or nearly the highest in the vertical direction and the measured distance to a front going vehicle corresponding to said object is within said predetermined range.

5. The distance measuring device of claim 2 wherein said scan is effected with a main beam scanning in one horizontal direction and a sub-beam in the opposite horizontal direction, said main beam and said sub-beam forming a frame to scan in a vertical direction;
    wherein said vehicle recognizing means, said range judging means and said vehicle confirming means operate in units of frames; and
    wherein said vehicle confirming means, when judging said second condition, examines whether the sub-beam of the previous frame was the highest or nearly the highest in the vertical direction and whether the difference between the distance to said object measured by the scan with said sub-beam that is the highest or nearly the highest in the vertical direction and the measured distance to a front going vehicle corresponding to said object is within said predetermined range.

6. The distance measuring device of claim 1 wherein said vehicle confirming means, if said object is once judged to be outside said specified preset range, confirms said object to be a vehicle in scans carried out thereafter.

7. The distance measuring device of claim 6 wherein said scan is effected with a main beam scanning in one horizontal direction and a sub-beam in the opposite horizontal direction, said main beam and said sub-beam forming a frame to scan in a vertical direction;
    wherein said vehicle recognizing means, said range judging means and said vehicle confirming means operate in units of frames; and
    wherein said vehicle confirming means, when judging said second condition, examines whether the sub-beam of the previous frame was the highest or nearly the highest in the vertical direction and whether the difference between the distance to said object measured by the scan with said sub-beam that is the highest or nearly the highest in the vertical direction and the measured distance to a front going vehicle corresponding to said object is within said predetermined range.

8. The distance measuring device of claim 1 wherein said scan is effected with a main beam scanning in one horizontal direction and a sub-beam in the opposite horizontal direction, said main beam and said sub-beam forming a frame to scan in a vertical direction;
    wherein said vehicle recognizing means, said range judging means and said vehicle confirming means operate in units of frames; and
    wherein said vehicle confirming means, when judging said second condition, examines whether the sub-beam of the previous frame was the highest or nearly the highest in the vertical direction and whether the difference between the distance to said object measured by the scan with said sub-beam that is the highest or nearly the highest in the vertical direction and the measured distance to a front going vehicle corresponding to said object is within said predetermined range.

* * * * *